(12) United States Patent
Hjelmstrom et al.

(10) Patent No.: US 8,754,975 B2
(45) Date of Patent: Jun. 17, 2014

(54) METHOD AND DIGITAL VIDEO CAMERA FOR IMPROVING THE IMAGE QUALITY OF IMAGES IN A VIDEO IMAGE STREAM

(75) Inventors: Jonas Hjelmstrom, Staffanstorp (SE); Jan Sonnvik, Malmo (SE)

(73) Assignee: Axis AB, Lund (SE)

( * ) Notice: Subject to any disclaimer, the term of this patent is extended or adjusted under 35 U.S.C. 154(b) by 176 days.

(21) Appl. No.: 13/324,597

(22) Filed: Dec. 13, 2011

(65) Prior Publication Data

US 2012/0147197 A1 Jun. 14, 2012

Related U.S. Application Data

(60) Provisional application No. 61/425,006, filed on Dec. 20, 2010.

(30) Foreign Application Priority Data

Dec. 14, 2010 (EP) .................................... 10194993

(51) Int. Cl.
*G02B 13/16* (2006.01)
*H04N 5/225* (2006.01)

(52) U.S. Cl.
USPC ........... 348/335; 348/340; 348/345; 348/348; 348/350

(58) Field of Classification Search
USPC .................. 348/335, 340, 345, 348, 350, 352
See application file for complete search history.

(56) References Cited

U.S. PATENT DOCUMENTS

| | | | |
|---|---|---|---|
| 7,239,757 B2 | 7/2007 | Kang et al. | |
| 2006/0050409 A1 | 3/2006 | George et al. | |
| 2006/0133688 A1 | 6/2006 | Kang et al. | |
| 2006/0291844 A1 | 12/2006 | Kakkori | |
| 2007/0104462 A1 | 5/2007 | Saito et al. | |
| 2008/0180569 A1 | 7/2008 | Imaida | |
| 2008/0218612 A1* | 9/2008 | Border et al. | 348/262 |
| 2009/0148146 A1 | 6/2009 | Maeda | |

FOREIGN PATENT DOCUMENTS

| | | |
|---|---|---|
| JP | 05048957 A | 2/1993 |
| JP | 8163423 A | 6/1996 |
| JP | 2002365519 A | 12/2002 |
| JP | 2006208703 A | 8/2006 |
| JP | 2007134991 A | 5/2007 |
| JP | 2008187667 A | 8/2008 |
| JP | 2009139688 A | 6/2009 |
| JP | 2010113291 A | 5/2010 |
| JP | 2010243922 A | 10/2010 |
| WO | 02059692 A1 | 8/2002 |
| WO | 2008031089 A2 | 3/2008 |
| WO | 2009120718 A1 | 10/2009 |

* cited by examiner

*Primary Examiner* — Yogesh Aggarwal
(74) *Attorney, Agent, or Firm* — Volpe and Koenig, P.C.

(57) ABSTRACT

A digital video camera performs a method to improve the image quality of captured images in a video image stream. The method includes capturing a first subset of images, outputting the images of the first subset of images as the video image stream, moving an image sensor and/or a lens of the digital video camera from a respective normal position to a respective test position before capturing an image of a second subset of images. The digital video camera captures a second subset of images interspersed with the first subset of images, compares image quality of the first subset of images with an image of the second subset of images, and determines if the image of the second subset of images exhibits improved image quality as compared with the image of the first subset of images. If so, an image quality improvement operation is initiated.

19 Claims, 11 Drawing Sheets

METHOD AND DIGITAL VIDEO CAMERA FOR IMPROVING THE IMAGE QUALITY OF IMAGES IN A VIDEO IMAGE STREAM

CROSS REFERENCE TO RELATED APPLICATIONS

This application claims the benefit of European Patent Application No. 10194993.1, filed on Dec. 14, 2010, and U.S. Provisional Application No. 61/425,006, filed on Dec. 20, 2010, which are incorporated by reference as if fully set forth.

FIELD OF THE INVENTION

The present invention relates to improving the image quality of the images in a video image stream captured by a digital video camera

BACKGROUND OF THE INVENTION

Digital video cameras have the ability of capturing moving images that may be shown, recorded or transferred continuously as a video image stream. Many digital video cameras have the ability to enhance the image quality or to change an image property by changing various settings. These settings are normally directly related to the image quality or the image property. Examples of settings that may affect the image quality or image property are refocusing, changing gain, changing the exposure time, changing the level and/or type of noise filtering, changing the white balance, changing color space, adjusting the image sensor vertically with regard to the optical axis in order to reduce the problem with Vignetting etc. Thus, image quality may be improved by e.g. changing focus, changing gain, changing the exposure time, changing the level and/or type of noise filtering, changing the white balance, changing color space, adjusting the image sensor vertically with regard to the optical axis, etc.

However, there is still a need for better technologies that may be used to improve image quality or to change image property on images captured with digital video cameras.

SUMMARY OF THE INVENTION

The present invention enables improvement of the quality of captured images. This is achieved by a method for improving the image quality of images in a video image stream captured by a digital video camera and a digital camera for improving the image quality of images in a video image stream.

In particular according to a first aspect of the invention, a method is provided for improving the image quality of images in a video image stream captured by a digital video camera. The method comprises capturing a first subset of images by the digital video camera, outputting the images of the first subset of images as the video image stream, moving an image sensor and/or a lens of the digital video camera from a respective normal position to a respective test position before capturing an image of a second subset of images, capturing the second subset of images using the digital camera, wherein the capturing of the second subset of images are interspersed with the capturing of the first subset of images, comparing an image of the first subset of images with an image of the second subset of images, determining based on the comparison if the image of the second subset of images exhibits improved image quality as compared with the image of the first subset of images. In a case of the image of the second subset of images exhibiting improved image quality as compared with the image of the first subset of images, an image quality improvement operation is initiated on the digital video camera.

In the context of the present invention the term relating to interspersed capturing of images is to be understood as capturing images from a second subset of images at intervals among images from a first subset of images. A first image from the second subset of images may be followed by a first image from the first subset of images and then followed by a second image from the second subset and alternate images from the first subset of images and the second subset of images respectively. Interspersed capturing may also relate to two or more images from the first subset of images being followed by one image from the second subset of images. Various interspersing combinations may be used within the scope of the invention. Interspersing may thus be used for images captured at either predetermined time intervals or dynamically defined time intervals.

By interspersing the capture of images of a first and a second subset of images using different positions of the image sensor and/or the lens of the digital video camera when capturing the images of a first or a second subset of images, the image quality of an image from the second subset of images may be compared with the image quality of an image from the first subset of images in order to decide whether or not the image quality has improved after movement of the image sensor and/or the lens. Subsequently, an image quality improvement operation may be initiated. Examples of image quality features possible to compare are the overall focus of an image of the video image stream, whether or not an area of interest of an image is in focus or not or the light sensibility of different pixels. Thus, the present invention allows inter-frame processing, e.g., comparing two images, in order to improve the image quality of the images in a video image stream captured by a digital video camera. The inter-frame processing is performed on, or using information from, an image captured (but not necessarily shown) between the capturing of two images/frames in the video image stream. The images captured in between the capturing of the images in the video image stream are captured using a different position of the image sensor and/or the lens of the digital video camera as compared to the images of the video image stream. Thus, the first subset of images is captured by the digital video camera using the image sensor and/or the lens of the digital video camera positioned in a respective normal position and the second subset of images is captured by the digital video camera having the image sensor and/or the lens of the digital video camera positioned in a respective test position, wherein the capturing of the second subset of images are interspersed with the capturing of the first subset of images. The image sensor of the digital video camera is typically operating at the double frame rate as of the displayed images, i.e., every second image would be used for the inter-frame processing and every second image will be displayed or recorded as the video image stream. According to one example, the image sensor of the digital video camera is arranged to capture 60 frames per second and the video image stream comprises 30 frames per second. Accordingly, a first image (being an image used in the video image stream) may be captured by the digital video camera, wherein the image sensor and/or the lens of the digital video camera is positioned in a respective normal position; either the position of the image sensor or the lens may be moved to the test position. Alternatively, both the image sensor and the lens may be moved to respective test position. A second image (normally not being an image used in the video image stream) may be captured, and a comparison between the second and first images may be performed.

Whether or not a specific parameter coupled to the image quality has been improved is determined when moving the image sensor and/or the lens to respective test position. If it is determined that the image quality has been improved after movement of the image sensor and/or the lens, an image quality improvement operation may be initiated. Examples of image quality improvement operations are a refocus operation, moving the image sensor vertically with respect to the optical axis in order to improve problems with Vignetting or tilt the image sensor in order to get a better view of a monitored fence.

The capturing of the second subset of images may be interspersed with the capturing of the first subset of images at a predetermined rate. For example an image of the second subset of images may be captured in between every image, every 2nd, 3rd, 4th, 5th, 6th, 7th, 8th, 9th or 10th (or even more seldom) image of the first subset of images.

According to one embodiment of the present invention, the images of the second subset of images are captured between every image of the first subset of images. An advantage with this configuration is that the image quality improvement operation may be initiated rapidly after an image quality reduction of the images in the first subset has occurred.

The capturing of the second subset of images may be interspersed with the capturing of the first subset of images at a dynamic rate depending on available bandwidth and/or system load. Thus, at high system load or at low bandwidth, images of the second subset of images may be captured more seldom.

The outputting of the images of the first subset of images as the video image stream may be made at a predetermined frame rate. As a non-limiting example, the video image stream may comprise 30 frames per second.

The method may comprise analyzing the sharpness of an image of the first subset of images and the sharpness of an image of the second subset of images and comparing the sharpness of the image of the first subset of images with the sharpness of the image of the second subset of images.

The method may comprise determining based on the comparison, if the sharpness of an image of the second subset has improved in relation to a previously captured image of the first subset. By the sharpness comparison made between the image from the second subset with the previously captured image from the first subset, it is possible to determine if the image of the first subset of images being shown, recorded or transferred as a frame in the video image stream is in focus or out of focus.

The method may further comprise initiating autofocus if the sharpness is determined to be improved. It is beneficial to initiate the autofocus only if the sharpness is determined to be improved since this saves the life time of the autofocus motor. For example, the autofocus motor may only be used when it is necessary to refocus.

The sharpness of an image may be determined by using a spatial high frequency analysis. A spatial high frequency analysis shows how much the various parts of an image that are in focus or out of focus. The sharpness of an image may be determined in various manners known by the skilled person. An example of determining the sharpness may be to use a Sobel filter, capable of detecting edges in the image and thereafter apply a Gaussian filter for smoothening of the image which results in a number that could be used as a value for sharpness. Alternatively, high frequency content may be calculated and serve as the decision point. Other options may be the Subjective Quality Factor (SQF), where the decision point is weighted after the frequency sensitivity of the eye and other factors.

The method may also comprise moving the image sensor and/or the lens to respective normal position before capturing an image of the first subset. Moving from the normal position to the test position and back again and doing this repeatedly allows for in-between analyses or processes, such as for example, images being alternately shown, recorded or transferred and alternately analyzed.

The step of moving the image sensor of the digital camera from the normal position to the test position may further comprise moving the image sensor to a first test position towards an optical input, and moving the image sensor to a second test position away from the optical input. The optical input being a part of the image capturing optical path. The advantage of moving the image sensor in order to test both in front of the normal position and behind the normal position is that it is possible to determine the direction of the autofocus motor once the autofocus is initiated. This enhances the life time of the autofocus motor even further by operating the motor in the correct direction when refocusing.

The step of moving the lens of the digital camera from the normal position to the test position may further comprise moving the lens to a first test position towards an optical input, and moving the lens to a second test position away from the optical input. The optical input being a part of the image capturing optical path. The advantage of moving the lens in order to test both in front of the normal position and behind the normal position, is that it is possible to determine the direction of the autofocus motor once the autofocus is initiated. This enhances the life time of the autofocus motor even further by operating the motor in the correct direction when refocusing.

The method may further comprise identifying an area of special interest within an image of the first subset of images. Consequently, the step of comparing an image of the first subset of images with an image of the second subset of images may be performed by comparing a subsection comprising the area of special interest of the image of the first subset of images with a subsection of the image of the second subset of images corresponding to the area of interest of the image of the first subset of images. The area of special interest may for example contain an object of special interest, such as a person entering the field of view of the digital camera. The object of special interest may be found, for example, by an image analysis process arranged to find interesting objects in an image. Examples of image analysis processes may be movement detection, face recognition or number plate recognition. In case of an object of special interest being found in an image, the subsequent testing of when an refocus initiation shall be started may be based on whether the object of special interest is in focus or not. That is, the in focus or out of focus analysis may be performed on a subsection (corresponding to the area of interest) of image data representing the images captured by the image sensor. If it is later found that the object of special interest is not present anymore, the in focus or out of focus test may be performed using the full image.

According to another aspect of the invention, a digital video camera for improving the image quality of images in a video image stream is provided. The digital video camera comprises an image sensor arranged to capture image data, an image processing means arranged to process the image data captured by the image sensor into images, and to output images as the video image stream, moving means arranged to move the image sensor and/or a lens from a respective normal position to a respective test position, the image processing means further being arranged to compare image quality of a first image being processed from image data being captured when the image sensor and/or the lens is located in the respective normal position with a second image being processed from image data being captured when the image sensor and/or the lens is located in the respective test position, the image processing means further being arranged to determine, based on the comparison, if the second image exhibits improved image quality as compared with the first image, the image processing means further being arranged to initiate an image quality improvement operation on the digital video camera in case of the second image exhibits improved image quality as compared with the first image.

The image processing means may further be arranged to compare image quality of the first and second images by analyzing the sharpness of the first and second images, and thereafter, comparing the sharpness of the first and second images.

The image processing means may also further be arranged to determine if the second image exhibits improved image quality as compared with the first image by checking if the sharpness the second image has improved in relation to the previously captured the first image.

Moreover, the image processing means may further be arranged to initiate an image quality improvement operation by initiating a refocus of the digital video camera.

The image processing means may be arranged to determine the sharpness of an image by using a spatial high frequency analysis.

The moving means may further be arranged to move the image sensor and/or a lens from the respective test position back to the respective normal position.

BRIEF DESCRIPTION OF THE DRAWINGS

This and other aspects of the present invention will now be described in more detail, with reference to appended drawings showing embodiments of the invention. The drawings should not be considered limiting the invention to the specific embodiment. Instead the drawings are used for explaining and understanding the invention.

DETAILED DESCRIPTION

Figure 1:
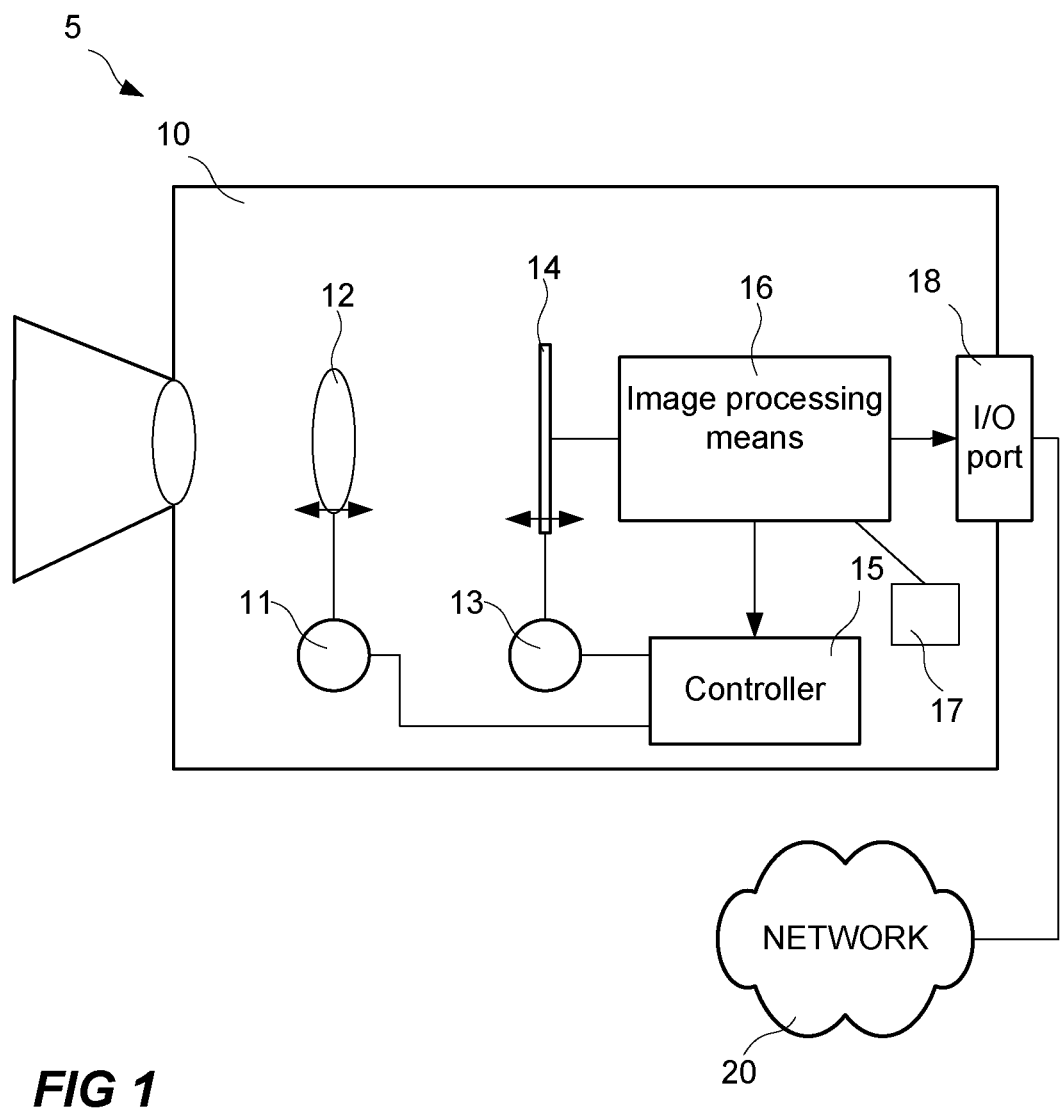
FIG. 1 is a schematic view of a digital video camera, according to one embodiment of the invention.

A general aspect of the present invention is to use inter-frame processing in order to improve the image quality of the images in a video image stream captured by a digital video camera. The inter-frame processing is performed on, or using information from, an image captured (but not necessarily shown) between the capturing of two images/frames in the video image stream. The images captured in between the capturing of the images in the video image stream are captured using a different camera setting of the digital video camera as compared to the images of the video image stream. Thus, a first subset of images is captured by the digital video camera using a first camera setting of the digital video camera and a second subset of images is captured by the digital video camera using a second camera setting of the digital video camera, wherein the capturing of the second subset of images are interspersed with the capturing of the first subset of images. The image sensor of the digital video camera is typically operating at the double frame rate as of the displayed images, i.e. every second image would be used for the inter-frame processing and every second image will be displayed or recorded as the video image stream. According to one example, the image sensor of the digital video camera is arranged to capture 60 frames per second and the video image stream comprises 30 frames per second.

Examples of camera settings that may be changed between the capturing of two images/frames of the video image stream are moving an image sensor of the camera in various directions as well as tilting the image sensor or moving a lens of the camera in various directions.

Accordingly, according to the present invention; a first image (being an image used in the video image stream) may be captured by the digital video camera, wherein a camera setting is in a first state; the camera setting may be changed into a second state; a second image (normally not being an image used in the video image stream) may be captured; a processing using information from the second image (or in some cases using information from both the first and second image) may be performed; the camera setting may be changed back to the first (original) state (used when capturing the first image); a third image may be captured; the camera setting may be changed again (not necessarily to the position used for capturing the second image), a fourth image may be captured, etc.

It shall also be noted that the inter-frame processing not necessarily need to be performed between each frame of the video image stream. The inter-frame processing can for example be performed using every 3rd, 4th, 5th, 6th, 7th, 8th, 9th or 10th image (or even more seldom) captured by the image sensor of the digital video camera. Moreover, alternatively the inter-frame processing can be done using a dynamic rate for example depending on available bandwidth and/or system load.

Below are described some different embodiments of the use of inter-frame processing in order to improve the image quality of images in a video image stream captured by a digital video camera.

According to a first aspect of the invention, the inter-frame processing is used in order to decide when and if a refocus of the digital video camera should be initiated.

In order to handle refocus in a digital video camera hill climbing methods to reach the focus position which gives the highest frequency content in an image or a part of an image are normally used. However, the focus motor of the digital video camera has a limited life time, often expressed as a maximum number of cycles the motor can be used. A typical focus motor is specified to last for 2 million cycles. This would mean no more than one focus change every three minutes for a digital camera being operable for 100,000 hours, which is a desired lifetime for a digital video camera. Hence, in order to preserve the focus motor there is a need for finding a method on when to initiate a refocus of the digital video camera in order to avoid unnecessary refocus initiations. Non-limiting examples of focus motors are DC-type motors or stepper-type motors.

According to one embodiment of the present invention inter-frame processing is performed on images captured when the image sensor of the digital video camera is moved in between capturing images/frames of the video image stream in order to decide when and if an refocus should be initiated.

A digital video camera 5 according to this embodiment is schematically shown in FIG. 1. The digital video camera 5 comprises a housing 10, a focusing lens 12, a focus motor 11, an image sensor 14, an actuator 13, a controller 15, an image processing means 16, a memory 17, and an I/O-port 18. The lens 12 is connected to the focus motor 11, which in turn is connected to and controlled by the controller 15. The image sensor 14 is connected to an actuator 13, which in turn is connected to and controlled by the controller 15. The image processing means 16 is arranged to receive image data from the image sensor 14 and to communicate with the controller 15 and the I/O-port 18. The digital camera 5 can be connected to a network 20 through the I/O-port 18.

The image sensor 14 is arranged to capture images at a predetermined frame rate. The image sensor 14 may be a CMOS-based sensor or a CCD sensor although other types of sensors are possible. The predetermined frame rate is typically between 30 and 60 frames per second although other frame rates are possible. The image sensor 14 is movable mounted and can be moved by a moving means, shown as the actuator 13, or a similar device. According to this embodiment, the actuator 13 is a camera setting changing member. Non-limiting examples of actuators are electrical motors, linear actuators or piezoelectric actuators.

The image sensor 14 can be positioned at a normal position and moved to a test position using the actuator 13. The normal position should be understood as a starting position in which the image sensor is positioned during ordinary operation of the camera. According to this embodiment, the normal position is a first state of the camera setting and the test position is a second state of the camera setting.

The test position can be divided further into a first test position and a second test position. The first test position is a position along the optical axis located towards an optical input of the digital camera 5 as compared to the normal position. The second test position is a position along the optical axis located away from the optical input of the digital camera 5 as compared to the normal position. Thus, the normal position is in this case a position between the first test position and the second test position.

The image data captured by the image sensor 14 are transferred to the image processing means 16. The transfer of image data from the image sensor 14 to the image processing means 16 may be performed in accordance with any transfer scheme known to the skilled person.

The image processing means 16 receives the captured image data from the image sensor 14 at the predetermined frame rate. The image processing means 16 is arranged to prepare and/or analyze the captured image data. The image processing means 16 is provided with two outputs, wherein the first output is connected to the I/O-port 18 and the second output is connected to the controller 15. The output, being connected to the I/O-port 18, is used for transferring images that are to be shown, recorded or transferred to a monitor, recorder, a server or the like. The output being connected to the controller 15 is used for sending instructions to the controller 15. The image processing means 16 may send images/instructions to the I/O-port 18 and the controller 15 either in parallel or in series.

The image processing means 16 is further arranged to determine a sharpness value for the captured images and store each of these values in the memory 17. The image processing means 16 is further arranged to compare the sharpness values stored in the memory 17 to determine if the sharpness has changed from one image to another.

The image processing means 16 may be implemented as an image processor using hardware and/or software adapted for analyzing and processing the image data. The sharpness of an image may be determined by the image processing means 16 using a spatial high frequency analysis, which analysis shows how much the various parts of an image that are in focus or out of focus. The image processing means 16 may be configured in various manners to determine sharpness of an image. An example of determining the sharpness may be to use a Sobel filter, capable of detecting edges in the image and thereafter apply a Gaussian filter for smoothening of the image which results in a number that could be used as a value for sharpness. Alternatively, high frequency content may be calculated and serve as the decision point. Other options may be the Subjective Quality Factor (SQF), where the decision point is weighted after the frequency sensitivity of the eye and other factors.

The controller 15 is connected to the actuator 13. The controller 15 is arranged to move the image sensor 14 by controlling the actuator 13. The controller 15 is also connected to the focus motor 11. The controller 15 is arranged to control the focus motor 11 in order to move the lens 12 in the digital camera 5 in order to refocus the images to be captured.

The I/O-port 18 is according to the shown embodiment used to connect the digital camera 5 to the network 20. The digital camera 5 may however also be connected directly to a monitor to show images or a recorder for saving images.

Figure 2A:
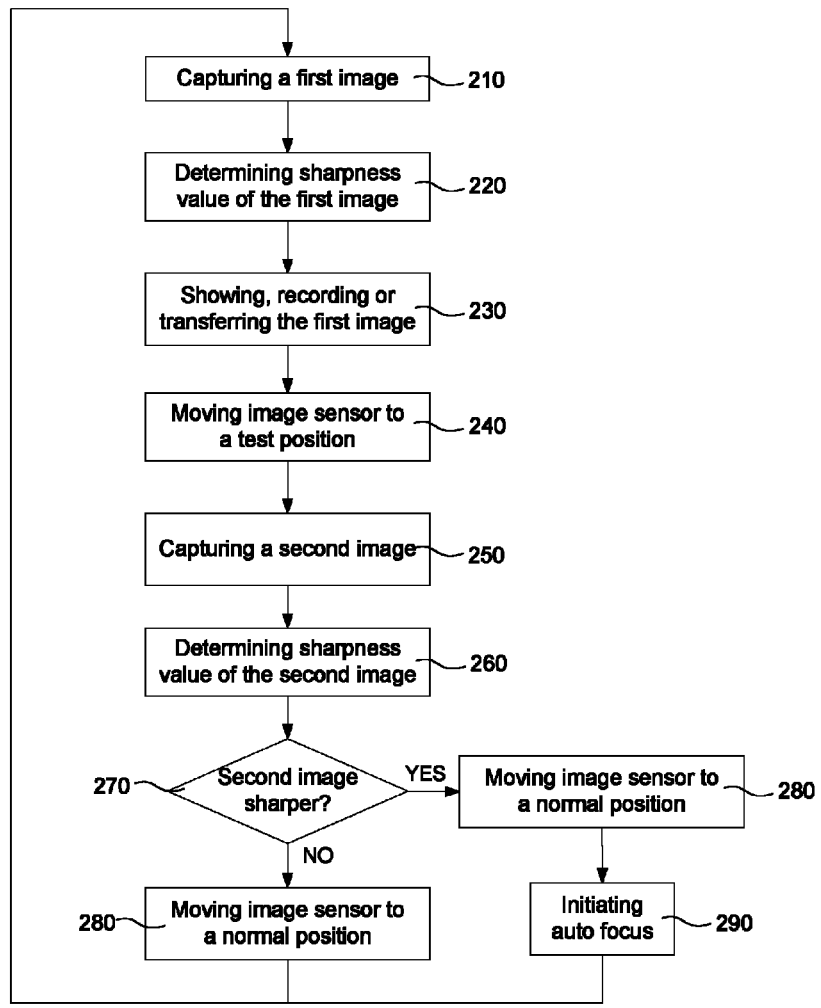
FIG. 2A is a schematic flow chart, showing the method according to an embodiment of the invention.
Figure 3A:
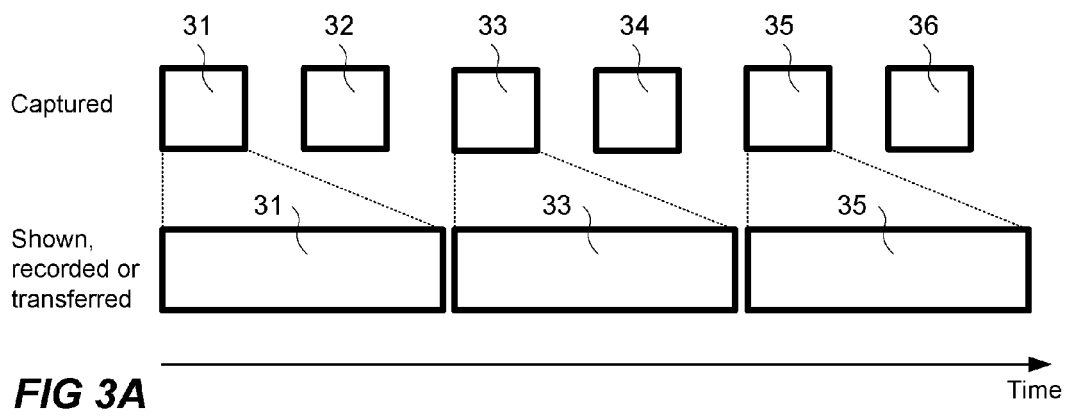
FIG. 3A is a schematic view, showing captured images and shown, recorded or transferred images according to an embodiment of the invention.

According to one embodiment of the present invention, the above described digital video camera 5 may be operated in the following manner in order to decide when to initiate the focus motor 11 in order to refocus the digital video camera 5. The operation is summarized in the flow chart of FIG. 2A and FIG. 3A illustrates images captured according to this embodiment.

Image data representing a first image 31 is captured 210 by the image sensor 14, wherein the image sensor 14 is being arranged in the normal position. The image data representing the first image 31 is transferred to the image processing means 16. A sharpness value of the captured first image 31 is determined 220 by the image processing means 16. The first image 31 is sent to the I/O-port 18 for showing, recording or transferring 230. The sharpness value of the first image 31 is stored in the memory 17. The sharpness value may be temporarily stored in the memory 17.

The image sensor 14 is moved to the test position 240 by the actuator 13. After or during the image sensor 14 is moved to the test position image data representing a second image 32 is captured 250. The image data representing the second image 32 is transferred to the image processing means 16. A sharpness value of the captured second image 32 is determined 260 by the image processing means 16. The sharpness value of the second image 32 is then stored in the memory 17. The sharpness value may be temporarily stored in the memory 17. Normally the second image 32 is not shown, recorded or transferred to the I/O-port 18.

The sharpness values of the first image 31 and the second image 32 is then compared with each other in order to determine 270 if the first image 31, being the image used in the video image stream, is in focus or out of focus. The sharpness value of the first image 31 may be retrieved from the memory 17 before being compared with the sharpness value of the second image 32. If the second image 32 is determined to be less sharp as compared to the first image 31, then the first image 31 is determined to be in focus. If, however, the second image 32 is determined to be sharper as compared to the first image 31, then the first image 31 is determined to be out of focus. After or during the comparison between the sharpness values of the first and second images 31 and 32 the image sensor may be moved back to the normal position 280.

In the case when it is determined that the first image 31 is out of focus, the image processing means 16 sends a signal to the controller 15, which in turn initiates 290 the refocus by starting the focus motor 11 to begin a refocus by moving the lens 12 and finding the focus position of the lens 12, for example, by starting hill climbing methods according to the above.

The process is repeated by capturing image data representing a third image 33 by the image sensor 14, and so on.

In this embodiment, the odd numbered images 31, 33, 35 are shown, recorded or transferred as the video image stream whereas the even numbered images 32, 34, 36 are used for comparison and testing only.

The odd numbered images 31, 33, 35 that are shown, recorded or transferred are in this embodiment interspersed with the even numbered images 32, 34, 36 that are inter-frame processed.

Figure 2B:
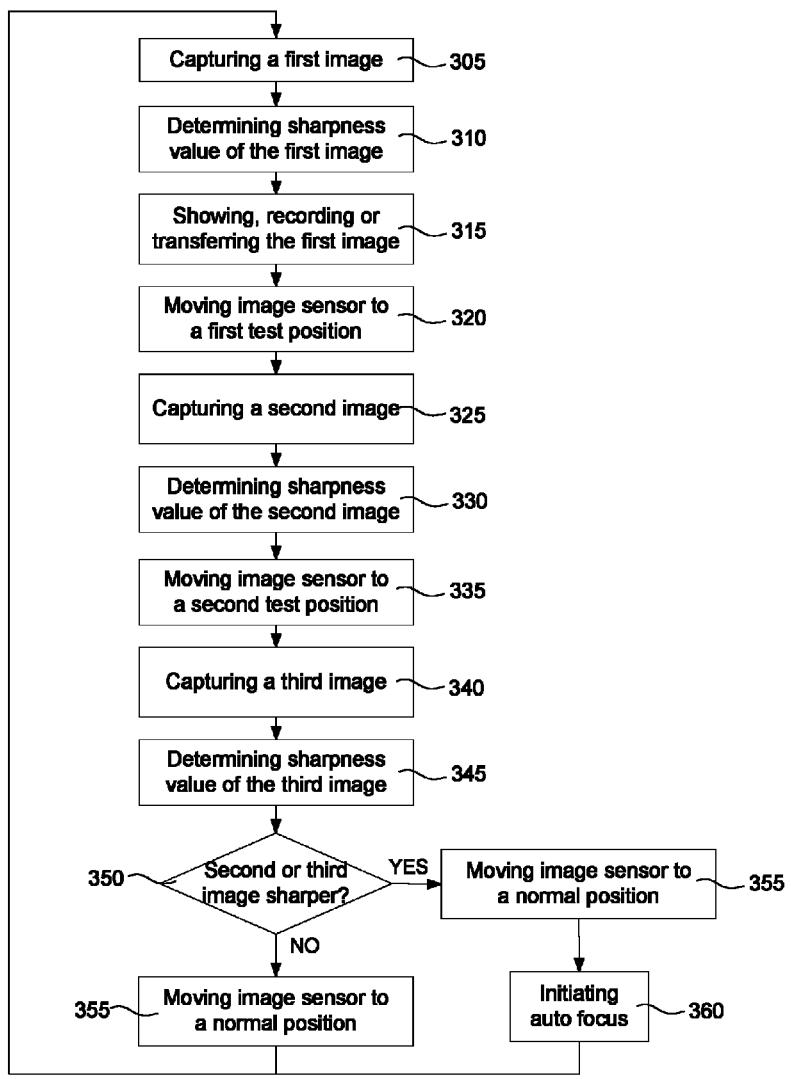
FIG. 2B is a schematic flow chart, showing the method according to another embodiment of the invention.
Figure 3B:
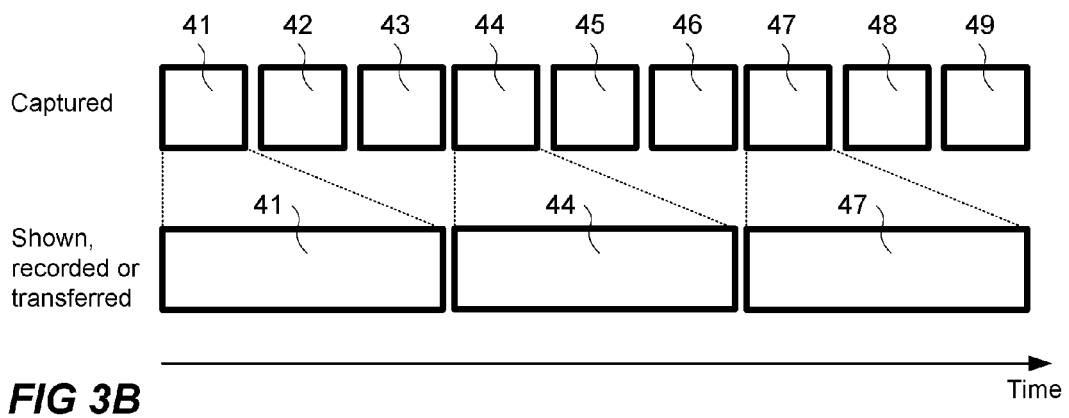
FIG. 3B is a schematic view, showing captured images and shown, recorded or transferred images according to another embodiment of the invention.

According to another embodiment of the present invention, the above described digital video camera 5 may be operated in the following manner in order to decide when to initiate the focus motor 11 in order to initiate a refocus of the digital video camera. The operation is summarized in the flow chart of FIG. 2B and FIG. 3B illustrates images captured according to this embodiment. According to this embodiment, two test images are captured in between capturing each image of the video image stream.

Image data representing a first image 41 is captured 305 by the image sensor 14, wherein the image sensor 14 is arranged in the normal position. The first image data representing the first image 41 is transferred to the image processing means 16 and a sharpness value of the first image 31 is determined 310 before sending the first image 41 further to the I/O-port 18 for showing, recording or transferring 315 of the first image 41.

According to this embodiment, the image sensor 14 is now moved to the first test position 320. After or during the image sensor 14 is moved to the first test position image data representing a second image 42 is captured 325 by the image sensor 14. The image data representing the second image 42 is transferred to the image processing means 16 and a sharpness value is determined 330. The image sensor 14 is moved 335 to the second test position. After or during the image sensor 14 is moved to the second test position, image data representing a third image 43 is captured 340 by the image sensor 14. The image data representing the third image 43 is then also transferred to the image processing means 16 and a sharpness value is determined 345 also for this third image 43.

The sharpness value of the first image 41, captured when the image sensor 14 was positioned at the normal position, is compared 350 with the sharpness values of the second and third images 42, 43, captured when the image sensor was 14 positioned at the first test position and the second test position, respectively, by the image processing means 16. After or during the comparison between the sharpness values of the first, second and third images 41, 42, 43, the image sensor is moved back to the normal position 355. If the second image 42 or third image 43 is determined 350 to be sharper than the first image 41, then the refocus is initiated 360.

The information about the sharpness from the first, second and third images 41, 42, 43 being captured at the various image sensor 14 positions, may also be used to determine the direction of the focus motor 11. For example, if the sharpness is better in the second image 42 captured at the first test position being positioned in front of the normal position of the image sensor 14 towards an optical input of the digital camera 5 as compared to the sharpness in the third image 43 captured at the second test position being positioned behind the normal position of the image sensor 14 away from the optical input of the digital camera 5, then the focus motor 11 may drive the focusing lens 12 to a position away from the optical input of the digital camera 5 in order for the lens 12 to be moved closer to the image sensor 14. The decision of the direction of the focus motor 11 may enhance the lifetime of the focus motor 11 itself even more. This because it will be possible to drive the focus motor 11 in the correct direction directly, rather than trying various directions the use of the focus motor 11 is decreased, thus leading to an increased lifetime of the focus motor 11.

The process is repeated by capturing image data representing a fourth image 44 by the image sensor 14, and so on.

According to this alternative embodiment of the first aspect of the invention, every third image 41, 44, 47 are shown, recorded or transferred as the video image stream whereas the other images 42, 43, 45, 46, 48, 49 are used for comparison and testing only.

Figure 2C:
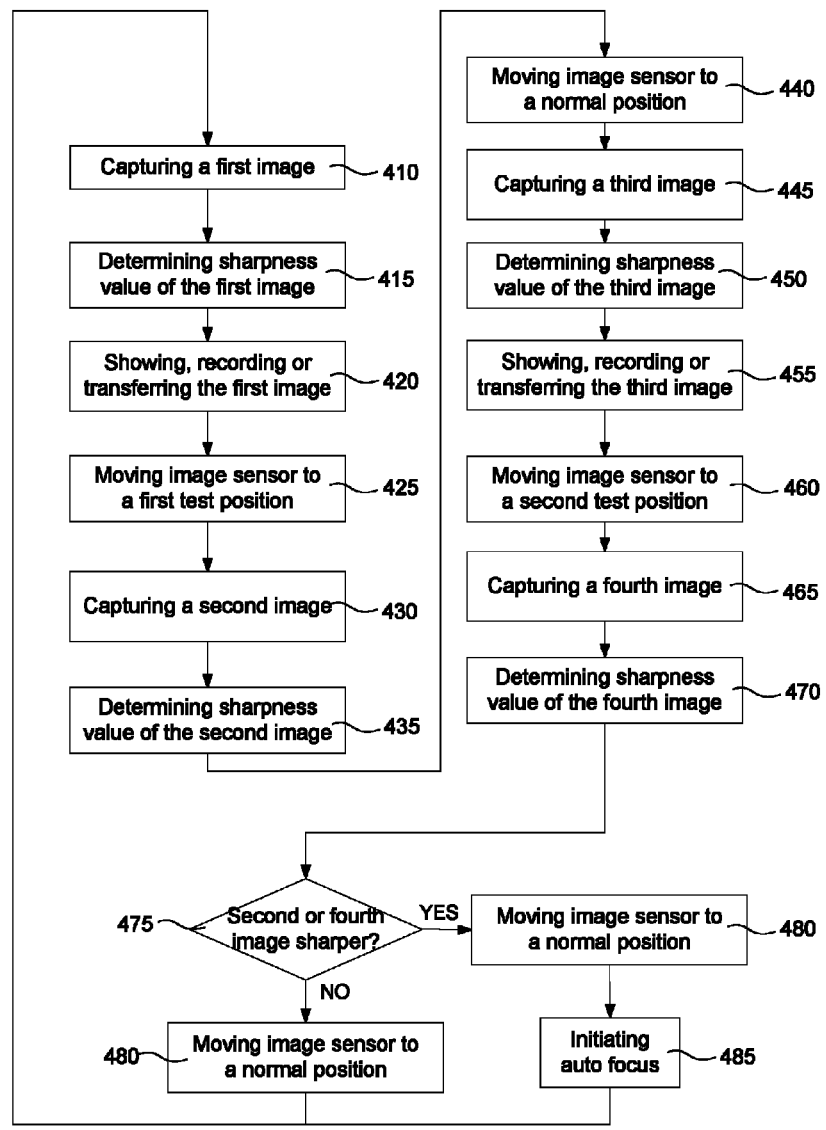
FIG. 2C is a schematic flow chart, showing the method according to yet another embodiment of the invention.
Figure 3C:
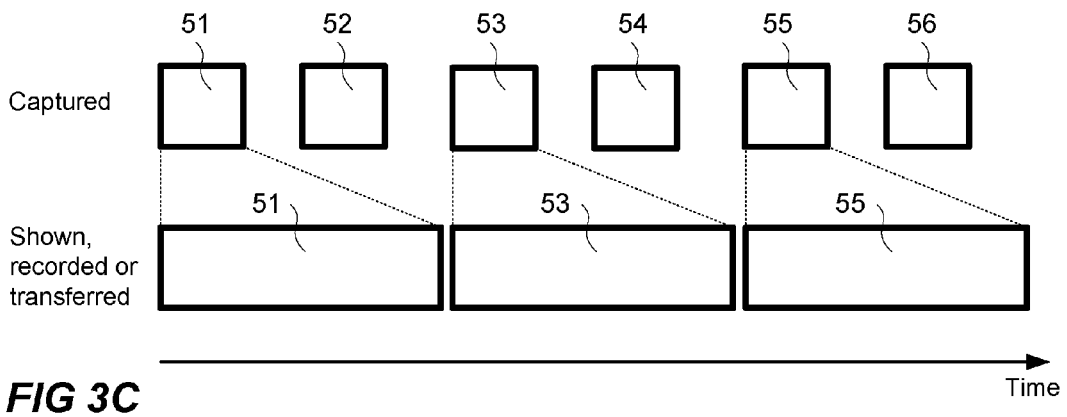
FIG. 3C is a schematic view, showing captured images and shown, recorded or transferred images according to yet another embodiment of the invention.

According to yet another embodiment of the present invention, the above described digital video camera 5 may be operated in the following manner in order to decide when to initiate the focus motor 11 in order to refocus the digital video camera 5. The operation is summarized in the flow chart of FIG. 2C and FIG. 3C illustrates images captured according to this embodiment.

Image data representing a first image 51 is captured 410 by the image sensor 14, wherein the image sensor 14 is arranged in the normal position. The image data representing the first image 51 is transferred to the image processing means 16 and a sharpness value is determined 415 before sending 420 the first image 51 further to be shown, recorded or transferred. The image sensor 14 is moved to the first test position 425. After or during the image sensor 14 is moved to the first test position image data representing a second image 52 is captured 430. The image data representing the second image 52 is then transferred to the image processing means 16 and a sharpness value is determined 435.

The image sensor 14 is now moved back to the normal position 440 and image data representing a third image 53 is captured 445. The image data representing the third image 53 is transferred to the image processing means 16 and a sharpness value is determined 450 for this third image 53 before sending 455 the third image 53 further to be shown, recorded or transferred.

The image sensor 14 is moved 460 to the second test position. After or during the image sensor 14 is moved to the second test position, image data representing a fourth image 54 is captured 465. The image data representing the fourth image 54 is then transferred to the image processing means 16 and a sharpness value of the fourth image 54 is determined 470.

The sharpness value of the first and third images 51, 53, captured when the image sensor 14 was positioned at the normal position, is compared 350 with the sharpness values of the second and fourth images 52, 54, captured when the image sensor was 14 positioned at the first test position and the second test position, respectively, by the image processing means 16. After or during the comparison between the sharpness values of the first, second, third and fourth images 51, 52, 53, 54, the image sensor is moved 480 back to the normal position. If the second image 52 or fourth image 54 is determined to be sharper 475 than the first image 51 or third image 53, then the refocus is initiated 485.

The information about the sharpness from the first, second, third and fourth images 51, 52, 53, 54 being captured at the various image sensor 14 positions, may then be used to determine the direction of the focus motor 11. For example, if the sharpness is better in the second image 52 captured at the first test position being positioned in front of the normal position of the image sensor 14 towards an optical input of the digital camera 5 as compared to the sharpness in the fourth image 54 captured at the second test position being positioned behind the normal position of the image sensor 14 away from the optical input of the digital camera 5, then the focus motor 11 may drive the focusing lens 12 to a position away from the optical input of the digital camera 5 in order for the lens 12 to be moved closer to the image sensor 14. The decision of the direction of the focus motor 11 may enhance the lifetime of the focus motor 11. This because it will be possible to drive the focus motor 11 in the correct direction directly, rather than trying various directions the use of the focus motor 11 is decreased, thus leading to an increased lifetime of the focus motor 11.

The steps as illustrated in FIG. 2C are then repeated. A fifth image 55 is captured by the image sensor 14, and so on.

According to this embodiment, every odd numbered image 51, 53, 55 is shown, recorded or transferred as the video image stream whereas the even numbered images 52, 54, 56 are used for comparison and testing only.

As valid for all the embodiments above, it is realized that it is not necessary to repeat the test in order to decide when and if a refocus should be initiated between every capture of the images in the image stream. For example may the test be made after every 10th image in the image stream, i.e. according to the embodiments shown in FIGS. 2A, 3A and 2B, 3B the test is then to be performed between image 10 and 11 of the images in the stream of images, between image 20 and 21 of the images in the stream of images, etc, and according to the embodiment shown in FIGS. 2C, 3C the test is then to be performed between images 10-12 of the images in the stream of images, between image 20-22 of the images in the stream of images, etc.

According to another embodiment of the first aspect of the present invention, the lens itself is moved in order to check if the captured images are in or out of focus. Alternative embodiments of a digital video camera being arranged to move the lens in order to check if the captured images are in or out of focus is schematically shown in FIGS. 4A and 4B.

Figure 4A:
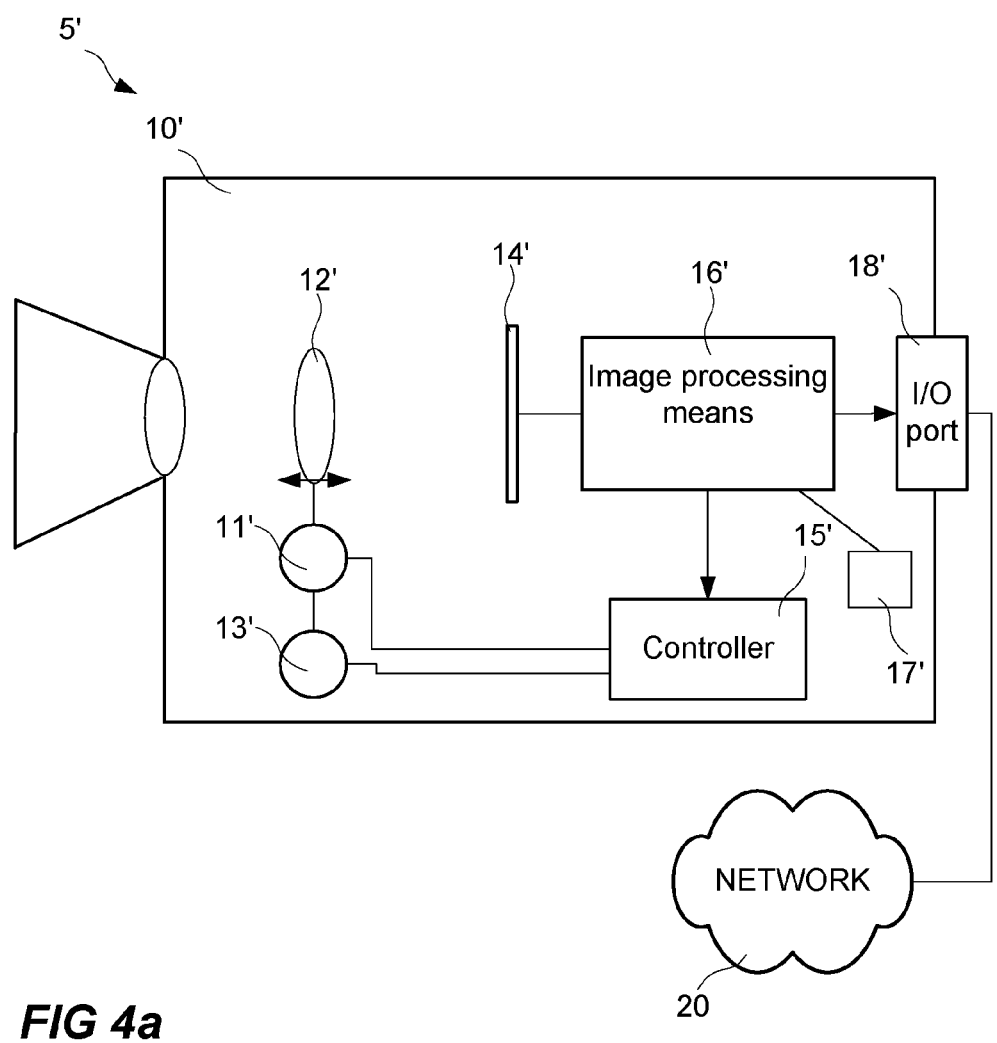
FIGS. 4A and 4B each show a schematic view of a digital camera, according to a second embodiment of the invention, connected to a network.
Figure 4B:
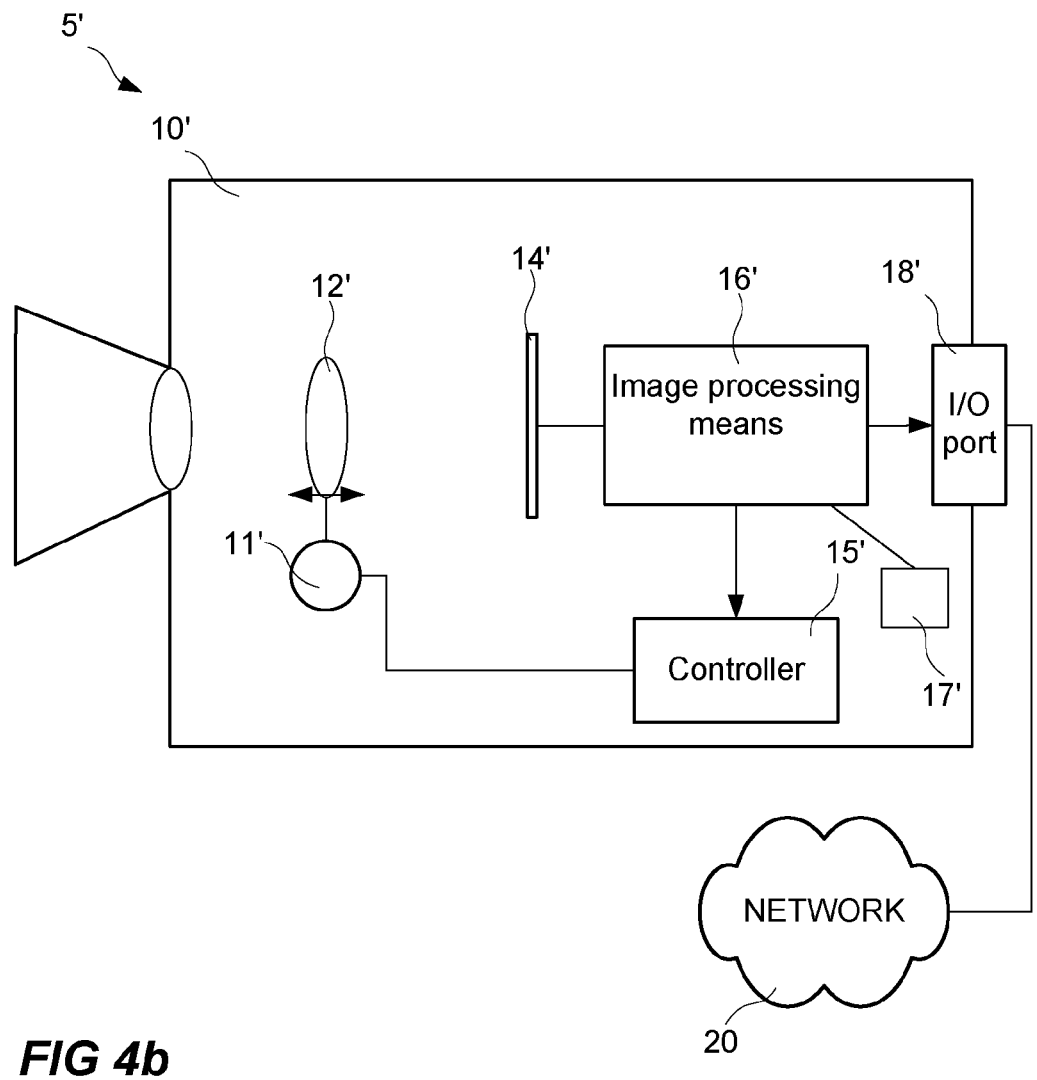

According to the embodiment as shown in FIG. 4A, the digital video camera 5' comprises a housing 10', a focusing lens 12', an focus motor 11', an actuator 13', an image sensor 14', a controller 15', an image processing means 16', a memory 17', and an I/O-port 18'. The focusing lens 12' is connected to both the actuator 13' and the focus motor 11'. Both the actuator 13' and the focus motor 11' are connected to and controlled by the controller 15'. The image processing means 16' is arranged to receive images from the image sensor 14' and to communicate with the controller 15' and the I/O-port 18'. The digital camera 5' can be connected to a network 20 through the I/O-port 18'.

The image sensor 14' is arranged to capture images at a predetermined frame rate. The image sensor 14' may be a CMOS-based sensor or a CCD sensor although other types of sensors are possible. The predetermined frame rate is typically between 30 and 60 frames per second although other frame rates are possible.

As shown in FIG. 4A, the actuator 13' is arranged to move both the lens 12' and the focus motor 11'. However, it is realized that the actuator 13' as well can be arranged in between the lens 12' and the focus motor 11', thus the focus motor 11' is in this case arranged to move both the lens 12' and the actuator 13'.

The lens 12' can be positioned at a normal position and moved to a test position using the actuator 13'. The normal position should be understood as a starting position in which the lens 12' is positioned during ordinary operation of the camera. According to this embodiment, the normal position is a first state of the camera setting and the test position is a second state of the camera setting.

The test position can be divided further into a first test position and a second test position. According to one embodiment, the first test position is a position along the optical axis located towards an optical input of the digital camera 5' as compared to the normal position. According to one embodiment, the second test position is a position along the optical axis located away from the optical input of the digital camera 5' as compared to the normal position. The normal position is in this case a position between the first test position and the second test position.

The image data captured by the image sensor 14' are transferred to the image processing means 16'. The transfer of image data from the image sensor 14' to the image processing means 16' may be performed in accordance with any transfer scheme known to the skilled person.

The image processing means 16' receives the captured image data from the image sensor 14' at the predetermined frame rate. The image processing means 16' is arranged to prepare and/or analyze the captured image data. The image processing means 16' is provided with two outputs, wherein the first output is connected to the I/O-port 18' and the second output is connected to the controller 15'. The output, being connected to the I/O-port 18', is used for transferring images that are to be shown, recorded or transferred to a monitor, recorder, a server or the like. The output being connected to the controller 15' is used for sending instructions to the controller 15'. The image processing means 16' may send images/instructions to the I/O-port 18' and the controller 15' either in parallel or in series.

The image processing means 16' is further arranged to determine a sharpness value for the captured images and store each of these values in the memory 17'. The image processing means 16' is further arranged to compare the sharpness values stored in the memory 17' to determine if the sharpness has changed from one image to another.

The sharpness of an image may be determined by using a spatial high frequency analysis, which analysis shows how much the various parts of an image that are in focus or out of focus. The sharpness of an image may be determined in various manners known by the skilled person. An example of determining the sharpness may be to use a Sobel filter, capable of detecting edges in the image and thereafter apply a Gaussian filter for smoothening of the image which results in a number that could be used as a value for sharpness. Alternatively, high frequency content may be calculated and serve as the decision point. Other options may be the Subjective Quality Factor (SQF), where the decision point is weighted after the frequency sensitivity of the eye and other factors.

The controller 15' is arranged to control the movement of the lens 12' via the actuator 13' as well as to control the refocusing of the digital video camera via the focus motor 11'.

The I/O-port 18' as shown in FIG. 4A is used to connect the digital camera 5' to the network 20. The digital camera 5' may however also be connected directly to a monitor to show images or a recorder for saving images.

As illustrated in FIG. 4B, it is further realized, in the case of the focus motor 11' being improved and thus being able to operate for more than 2 million cycles, that the focus motor itself can be used both as the function of the actuator, thus, for moving the lens in order to check if the captured images are in or out of focus, and as a focus motor for refocusing the digital video camera 5' when needed. Thus, the function of the actuator and the focus motor is both handled by the focus motor. According to this embodiment, the focus motor 11' is a camera setting changing member.

According to the embodiment as shown in FIG. 4B, the digital video camera 5' comprises a housing 10', a focusing lens 12', an focus motor 11', an image sensor 14', a controller 15', an image processing means 16', a memory 17', and an I/O-port 18'. The focusing lens 12' is connected to the focus motor 11'. The focus motor 11' are connected to and controlled by the controller 15'. The controller 15' is arranged to control the movement of the lens 12' via the focus motor 11' as well as to control the refocusing of the digital video camera also this via the focus motor 11'.

In the description below it is stated that it is the actuator 13' that is used for moving the lens 12' between the normal position and the test position/s however as shown according to the embodiment of FIG. 4B it is realized that the lens 12' as well may be moved by the focus motor 11' itself.

Figure 5A:
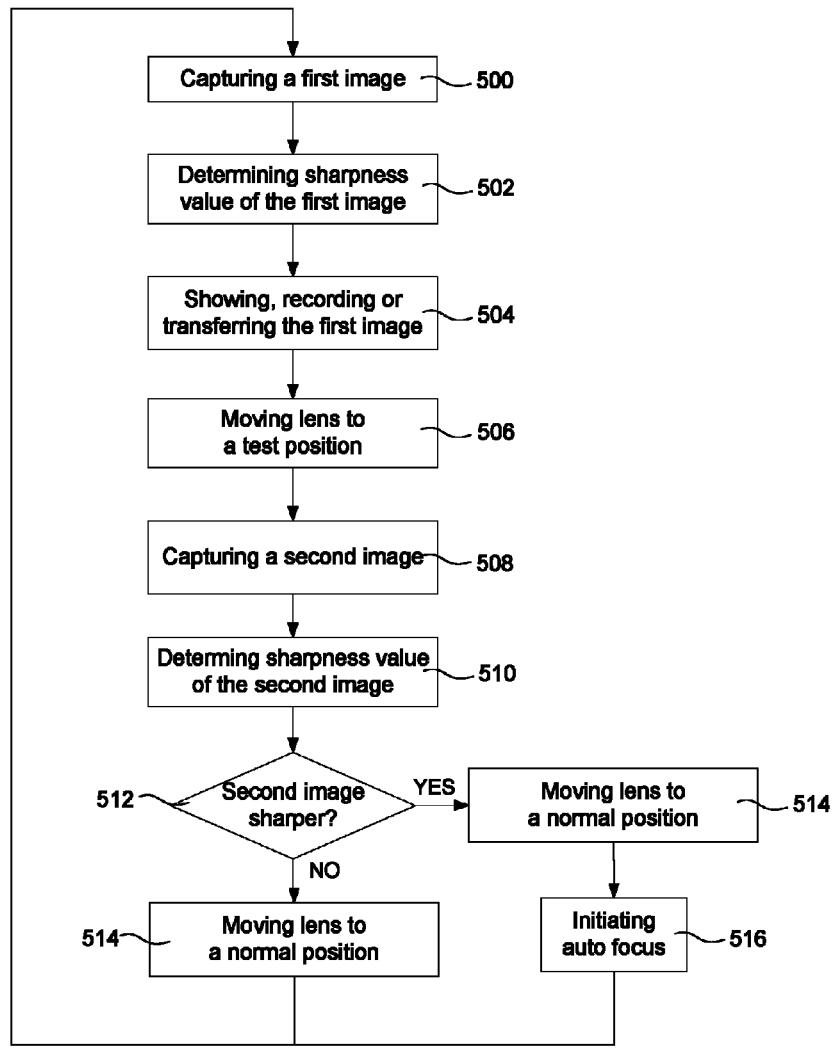
FIG. 5A is a schematic flow chart, showing the method according to an embodiment of the invention.

According to one embodiment of the present invention the above described digital video camera 5', depicted as different embodiments in FIG. 4A and FIG. 4B, may be operated in the following manner in order to decide when to initiate the focus motor 11' in order to refocus the digital video camera 5'. The operation is summarized in the flow chart of FIG. 5A and FIG. 3A illustrates images captured according to this embodiment.

Image data representing a first image 31 is captured 500 by the image sensor 14', wherein the image lens 12' is being arranged in the normal position. The image data representing the first image 31 is transferred to the image processing means 16'. A sharpness value of the captured first image 31 is determined 502 by the image processing means 16'. The first image 31 is sent 504 to the I/O-port 18' for showing, recording or transferring. The sharpness value of the first image 31 is stored in the memory 17'. The sharpness value may be temporarily stored in the memory 17'.

The lens 12' is moved to the test position 506 by the actuator 13'. After or during the lens 12' is moved to the test position, image data representing a second image 32 is captured 508. The image data representing the second image 32 is transferred to the image processing means 16'. A sharpness value of the captured second image 32 is determined 510 by the image processing means 16'. The sharpness value of the second image 32 is then stored in the memory 17'. The sharpness value may be temporarily stored in the memory 17'. Normally the second image 32 is not shown, recorded or transferred to the I/O-port 18'.

The sharpness values of the first image 31 and the second image 32 is then compared with each other in order to determine 512 if the first image 31, being the image used in the video image stream, is in focus or out of focus. The sharpness value of the first image 31 may be retrieved from the memory 17' before being compared with the sharpness value of the second image 32. If the second image 32 is determined to be less sharp as compared to the first image 31, then the first image 31 is determined to be in focus. If, however, the second image 32 is determined to be sharper as compared to the first image 31, then the first image 31 is determined to be out of focus. After or during the comparison between the sharpness values of the first and second images 31, 32 the lens 12' may be moved 514 back to the normal position.

In the case when it is determined that the first image 31 is out of focus, the image processing means 16' sends a signal to the controller 15', which in turn initiates 516 the refocus by starting the focus motor 11' to begin a refocus by moving the lens 12' and finding the focus position of the lens 12', for example, by starting hill climbing methods according to above.

The process is repeated by capturing image data representing a third image 33 by the image sensor 14', and so on.

In this embodiment, the odd numbered images 31, 33, 35 are shown, recorded or transferred as the video image stream whereas the even numbered images 32, 34, 36 are used for comparison and testing only.

The odd numbered images 31, 33, 35 that are shown, recorded or transferred are in this embodiment interspersed with the even numbered images 32, 34, 36 that are inter-frame processed.

Figure 5B:
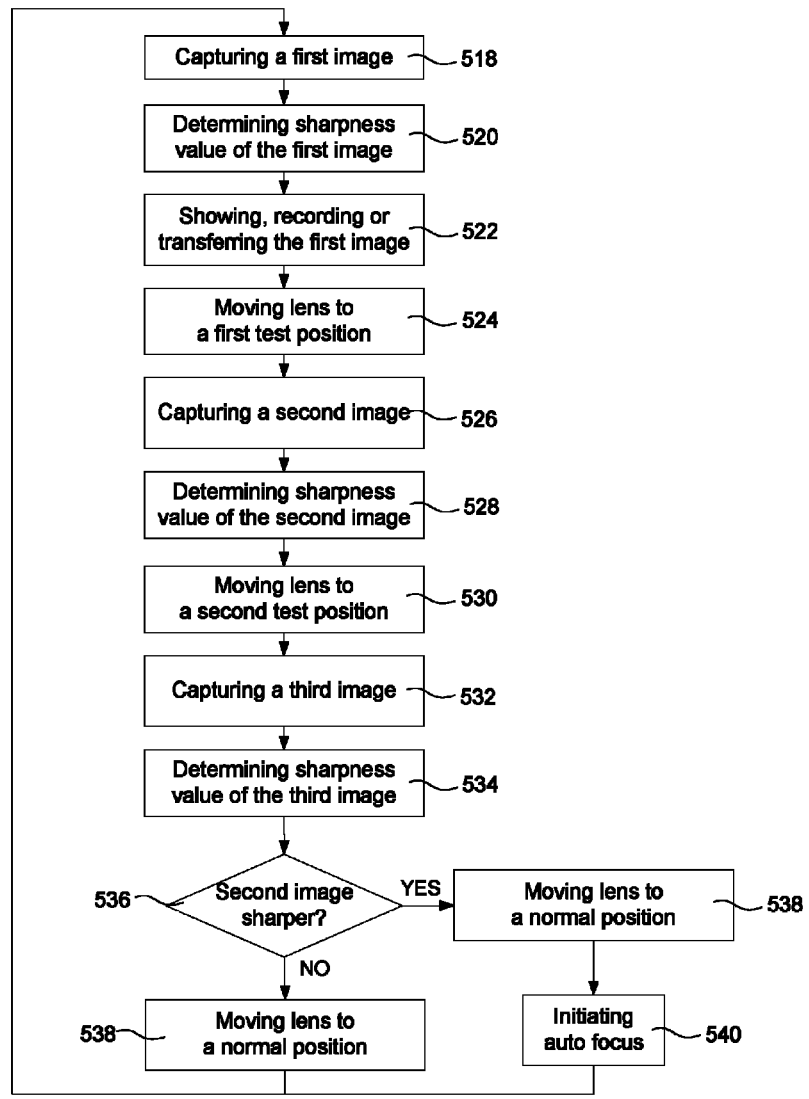
FIG. 5B is a schematic flow chart, showing the method according to another embodiment of the invention.

According to another embodiment of the present invention, the above described digital video camera 5', depicted in FIG. 4A or FIG. 4B, may be operated in the following manner in order to decide when to initiate the focus motor 11' in order to initiate a refocus of the digital video camera. The operation is summarized in the flow chart of FIG. 5B and FIG. 3B illustrates images captured according to this embodiment. According to this embodiment two test images are captured in between capturing each image of the video image stream.

Image data representing a first image 41 is captured 518 by the image sensor 14', wherein the lens 12' is arranged in the normal position. The first image data representing the first image 41 is transferred to the image processing means 16' and a sharpness value of the first image 31 is determined 520 before sending 522 the first image 41 further to the I/O-port 18' for showing, recording or transferring of the first image 41.

According to this embodiment, the lens 12' is now moved to the first test position 524. After or during lens 12' is moved to the first test position image data representing a second image 42 is captured 526 by the image sensor 14'. The image data representing the second image 42 is transferred to the image processing means 16' and a sharpness value is determined 528. The lens 12' is moved 530 to the second test position. After or during the lens 12' is moved to the second test position image data representing a third image 43 is captured 532 by the image sensor 14'. The image data representing the third image 43 is then also transferred to the image processing means 16' and a sharpness value is determined 534 also for this third image 43.

The sharpness value of the first image 41, captured when the lens 12' was positioned at the normal position, is compared 536 with the sharpness values of the second and third images 42, 43, captured when the lens 12 was positioned at the first test position and the second test position, respectively, by the image processing means 16'. After or during the comparison between the sharpness values of the first, second and third images 41, 42, 43, the lens 12' is moved back to the normal position 538. If the second image 42 or third image 43 is determined to be sharper than the first image 41, then the refocus is initiated 540.

The information about the sharpness from the first, second and third images 41, 42, 43 being captured at the various lens 12' positions, may also be used to determine the direction of the focus motor 11'. For example, if the sharpness is better in the image 42 captured at the first test position being positioned in front of the normal position of the lens 12' towards the optical input of the digital camera 5' as compared to the sharpness in the image 43 captured at the second test position being positioned behind the normal position of the lens 12' away from the optical input of the digital camera 5', then the focus motor 11' is optimally driving the lens 12' to a position towards the optical input of the digital camera 5' in order for the lens 12' to be moved away from the image sensor 14'. The decision of the direction of the focus motor 11' may enhance the lifetime of the focus motor 11' itself. Since it will be possible to drive the focus motor 11' in the correct direction directly, rather than trying various directions, the use of the focus motor 11' is decreased, thus leading to an increased lifetime of the focus motor 11'.

The process is repeated by capturing image data representing a fourth image 44 by the image sensor 14', and so on.

According to this alternative embodiment of the first aspect of the invention, every third image 41, 44, 47 are shown, recorded or transferred as the video image stream whereas the other images 42, 43, 45, 46, 48, 49 are used for comparison and testing only.

Figure 5C:
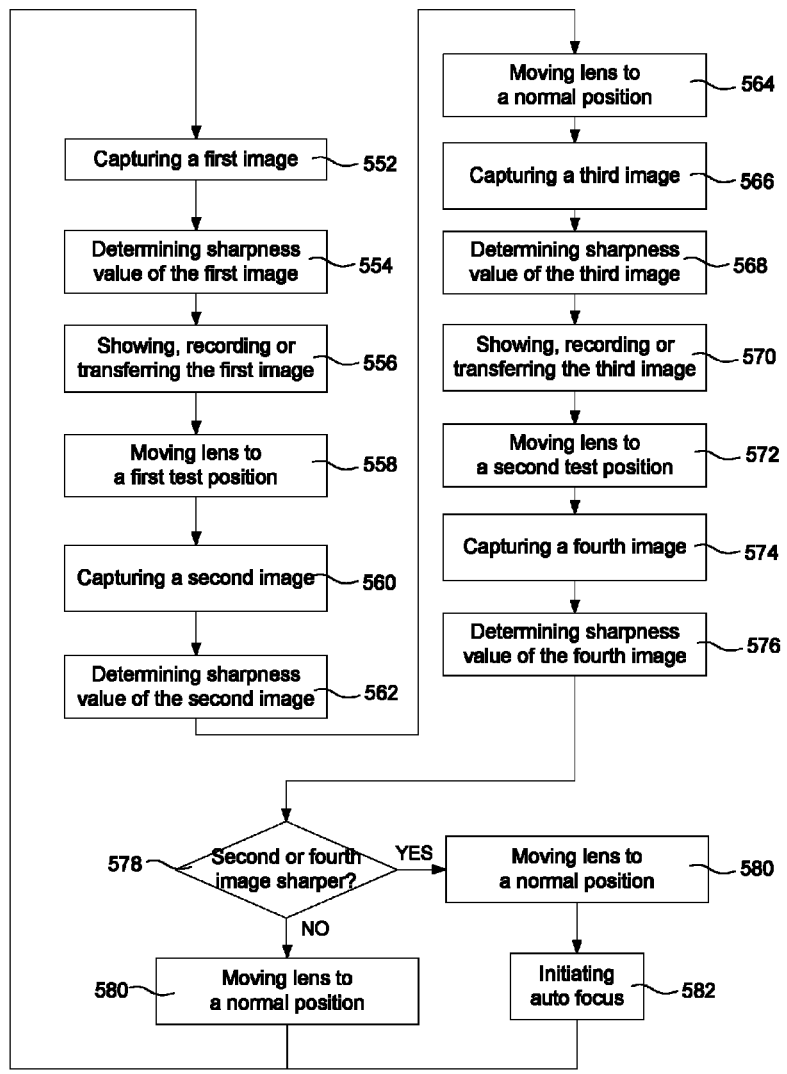
FIG. 5C is a schematic flow chart, showing the method according to yet another embodiment of the invention.

According to yet another embodiment of the present invention the above described digital video camera 5', depicted in FIG. 4A or FIG. 4B, may be operated in the following manner in order to decide when to initiate the focus motor 11' in order to refocus the digital video camera. The operation is summarized in the flow chart of FIG. 5C and FIG. 3C illustrates images captured according to this embodiment.

Image data representing a first image 51 is captured 552 by the image sensor 14', wherein the lens 12' is arranged in the normal position. The image data representing the first image 51 is transferred to the image processing means 16' and a sharpness value is determined 554 before sending 556 the first image 51 further to be shown, recorded or transferred. The lens 12' is moved to the first test position 558. After or during the lens 12' is moved to the first test position image data representing a second image 52 is captured 560. The image data representing the second image 52 is then transferred to the image processing means 16' and a sharpness value is determined 562.

The lens 12' is now moved back to the normal position 564 and image data representing a third image 53 is captured 566. The image data representing the third image 53 is transferred to the image processing means 16' and a sharpness value is determined 568 for this third image 53 before sending 570 the third image 53 further to be shown, recorded or transferred.

The lens 12' is moved 572 to the second test position. After or during the lens 12' is moved to the second test position image data representing a fourth image 54 is captured 574. The image data representing the fourth image 54 is then transferred to the image processing means 16' and a sharpness value of the fourth image 54 is determined 576.

The sharpness value of the first and third images 51, 53, captured when the lens 12' was positioned at the normal position, is compared 578 with the sharpness values of the second and fourth images 52, 54, captured when the lens 12' was positioned at the first test position and the second test position, respectively, by the image processing means 16'. After or during the comparison between the sharpness values of the first, second, third and fourth images 51, 52, 53, 54, the lens 12' is moved 580 back to the normal position. If the second image 52 or fourth image 54 is determined to be sharper 578 than the first image 51 or third image 53, then the refocus is initiated 582.

The information about the sharpness from the first, second, third and fourth images 51, 52, 53, 54 being captured at the various lens 12' positions, may then be used to determine the direction of the focus motor 11'. For example, if the sharpness is better in the second image 52 captured at the first test position being positioned in front of the normal position of the lens 12' towards an optical input of the digital video camera 5' as compared to the sharpness in the fourth image 54 captured at the second test position being positioned behind the normal position of the lens 12' away from the optical input of the digital video camera 5', then the focus motor 11' may drive the focusing lens 12 to a position towards from the optical input of the digital video camera 5' in order for the lens 12' to be moved away from the image sensor 14'. The decision of the direction of the focus motor 11' may enhance the lifetime of the focus motor 11'. This because it will be possible to drive the focus motor 11 in the correct direction directly, rather than trying various directions the use of the focus motor 11' is decreased, thus leading to an increased lifetime of the focus motor 11'.

The steps as illustrated in FIG. 5C are then repeated. A fifth image 55 is captured by the image sensor 14', and so on.

According to this embodiment, every odd numbered image 51, 53, 55 is shown, recorded or transferred as the video image stream whereas the even numbered images 52, 54, 56 are used for comparison and testing only.

It is realized that it is not necessary to repeat the test in order to decide when and if a refocus should be initiated between every capture of the images in the video image stream. For example may the test be made after every 10th image in the video image stream, i.e. according to the embodiments shown in FIGS. 5A, 3A and 5B, 3B the test is then to be performed between image 10 and 11 of the images in the video image stream, between image 20 and 21 of the images in the video image stream, etc, and according to the embodiment shown in FIGS. 5C, 3C the test is then to be performed between images 10-12 of the images in the video image stream, between image 20-22 of the images in the video image stream, etc.

According to one embodiment of the first aspect of the present invention, refocus initiation is based on information from a part of an image, the part being an area of special interest in an image. The area of special interest may for example contain an object of special interest, e.g., a person entering the field of view of the digital camera 5; 5'. The object of special interest may be found for example by an image processing means 16; 16' to perform an image analysis process arranged to find interesting objects in an image. Examples of image analysis processes may be movement detection, face recognition or number plate recognition.

In case of an object of special interest being found in an image the subsequent testing of when an refocus initiation shall be started may be based on if the object of special interest is in focus or not. That is, the in or out of focus analysis may be performed on a subsection (corresponding to the area of interest) of image data representing the images captured by the image sensor 14; 14'. If later it is found that the object of special interest is not present any more the in focus or out of focus test may be performed using the full image.

It is realized that both the embodiment of the digital video camera 5 that is arranged to move the image sensor 14 between the normal position and the test position and the embodiment of the digital video camera 5' that is arranged to move the lens 12' between the normal position and the test position may be used in accordance with this embodiment. Moreover, the skilled person also realizes that the image sensor 14 of the digital video camera 5 or the lens 12' of the digital video camera 5' may be moved to one or both of the first and second test positions, compare what is disclosed above.

Figure 6:
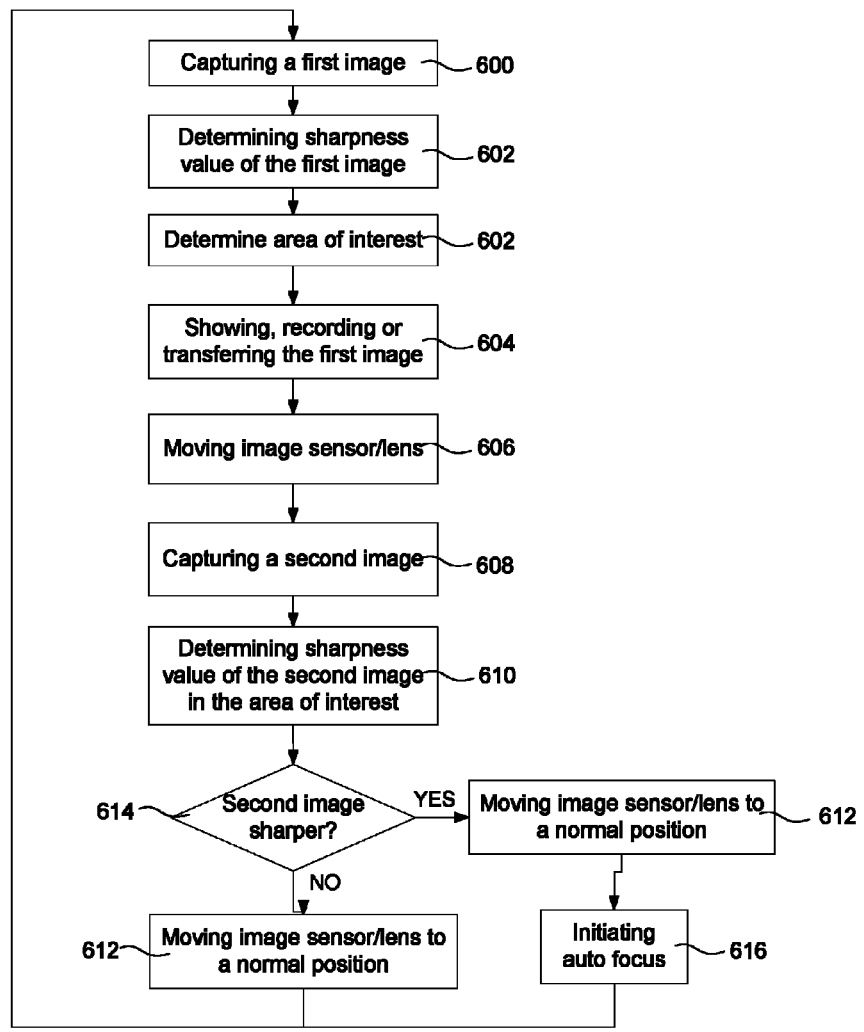
FIG. 6 is a schematic flow chart, showing the method according to an embodiment of the invention.

The embodiment of refocus initiation based on information from a part of an image, the part being an area of special interest in an image is depicted in FIG. 6. Image data representing a first image is captured 600 by the image sensor 14; 14' in the digital camera 5; 5'. The image data representing the first image is transferred to the image processing means 16; 16'. By, for example, performing an image analysis on the captured image for identifying an interesting object or area in the image data representation of the first image, an area of interest is determined 602, and a sharpness value for the area of interest in the first image is determined by the image processing means 16; 16'. The sharpness value of the area of interest in the first image is stored in the memory 17; 17'. The first image is sent 604 to the I/O-port 18; 18' for showing, recording or transferring. The image sensor/lens 14/12' is moved 606 to a test position. After or during the movement of the image sensor/lens 14/12' to the test position, image data representing a second image is captured 608 by the image sensor 14; 14' in the digital camera 5, 5'. A sharpness value of the area of interest in the captured second image is determined 610 by the image processing means 16; 16' The sharpness value is stored in the memory 17; 17'. The second image is usually not shown, recorded or transferred to the I/O-port 18; 18'.

The sharpness value of the area of interest in the first image is compared with the sharpness value of the area of interest in the second image in order to determine 614 if the area of interest in the first image is in focus or out of focus. The sharpness value of the area of interest in the first image may be retrieved from the memory 17; 17' before being compared with the sharpness value from the area of interest in the second image. After or during the comparison of the sharpness values, the image sensor/lens 14/12' is moved back 612 to the normal position.

If the area of interest in the second image is determined to be less sharp as compared to the area of interest in the first image, then the first image is determined to be in focus. If, however, the area of interest in the second image is determined to be sharper, then the first image is determined to be out of focus.

In the case when it is determined that the first image is out of focus, the image processing means 16; 16' sends a signal to the controller 15; 15', which in turn initiates 616 the refocus by starting the focus motor 11; 11' to begin a refocus by moving the lens 12; 12' and finding the focus position of the lens 12; 12', for example, by starting hill climbing methods according to above.

The person skilled in the art realizes that the present invention by no means is limited to the aspect and embodiments described above. For example, the image sensor may be moved vertically in the plane 90 degrees from the optical axis in between capturing two images. In order to reduce shaking where the second subset is used to check if the image has moved and to vertically compensate for, or anticipate, further movement before the following image belonging to the first subset is captured. Another application of moving the image sensor vertically in the plane 90 degrees from the optical axis in between capturing two images would be to move the image sensor during the in-between capturing of two video image frames with the aim to remove dust from the image sensor surface. Also, the problem with Vignetting, the fact that the lens is less light sensitive the closer to the periphery of the lens, may be improved by vertical adjustment. Through image analysis of the second subset, the optimal vertical position of the sensor 14; 14' may be found by ensuring the same amount of "defects" in each corner of the sensor.

According to another example, a movement resulting in a (changed) tilt of the image sensor in between capturing two images is performed. This is especially useful in the application of "fence monitoring". With a slight increase and decrease of tilt, it can be decided if the original tilt still is appropriate. If focus adjustment is needed, the refocus process is started with the original tilt and with the result an improved tilt may be found. Alternatively, if the "monitored fence" may have moved or disappeared, the refocus process may restart having the sensor straight, calculating the best tilt based on the result. This may well be the case in a Pan/Tilt camera where the field of view may change. The tilt change of the sensor will lead to a changed perspective in the image. The tilt of the sensor will create enlargement of parts of the image depending on how the sensor is tilted. Application may be "fence monitoring" where the sensor is tilted in the horizontal direction, or having the sensor tilted in the vertical direction and thereby for instance straightening up the view of a high rise building so that it's sides are vertically straight.

According to yet another example in case of an image analysis being performed finding an interesting object in the video image stream captured by the digital video camera, the second subset may be captured with different cameras settings being a change in an image parameter such as exposure or gain depending on the object found. For instance a lower gain gives less noise and a better result for a focus analysis. If the object is over exposed, there may be too little high frequency data for a valid focus analysis. With a modified exposure time, the focus analysis may be improved, i.e., modified image parameters, in combination with the movement of the image sensor 14 or the lens 12', for the second subset may be used as a tool to better decide when to restart the refocus process.

According to yet another example, in some applications one would benefit from having a large depth of field, i.e. having more than one object in focus at the same time, in the images of the video image stream captured by a digital video camera. According the present invention, the camera setting is changed between capturing images of the first subset of images and the second subset of images. An image of the first subset of images can then be combined with an image from the second subset of images in order to produce a frame in the video image stream having a better depth of field. The resulting image is an image having a better depth of field with various parts being in focus even though there in reality is a large distance between various objects in the image.

It is also realized that the above described embodiments may be combined. Thus, many modifications and variations are possible within the scope of the appended claims.

The invention claimed is:

1. A method for improving the image quality of images in a video image stream captured by a digital video camera, comprising:
 capturing a first subset of images by the digital video camera;
 outputting the images of the first subset of images as the video image stream;

moving an image sensor and/or a lens of the digital video camera from a respective normal position to a respective test position, the test position being different from the normal position;

capturing an image of a second subset of images while the image sensor and/or a lens of the digital video camera is in the test position, capturing the second subset of images using the digital camera, wherein the capturing of the second subset of images is interspersed with the capturing of the first subset of images at a dynamic rate dependent on at least one of bandwidth and system load;

comparing image quality, based on analyzing sharpness, of an image of the first subset of images with an image of the second subset of images; and determining, based on the comparison of image quality, if the image of the second subset of images exhibits improved image quality as compared with the image of the first subset of images;

wherein on a condition that the image of the second subset of images exhibits improved image quality as compared with the image of the first subset of images, initiating a refocus operation on the digital video camera.

2. The method according to claim 1, wherein the capturing of the second subset of images is interspersed with the capturing of the first subset of images at a predetermined rate.

3. The method according to claim 1, wherein outputting the images of the first subset of images as the video image stream is made at a predetermined frame rate.

4. The method according to claim 1, wherein the sharpness of an image is determined by using a spatial high frequency analysis.

5. The method according to claim 1, further comprising moving the image sensor and/or the lens to the respective normal position before capturing an image of the first subset.

6. The method according to claim 1, wherein moving the image sensor of the digital video camera from the normal position to the test position further comprises:

moving the image sensor to a first test position towards an optical input of the digital video camera; and moving the image sensor to a second test position away from the optical input of the digital video camera.

7. The method according to claim 1, wherein moving the lens of the digital video camera from the normal position to the test position further comprises:

moving the lens to a first test position towards an optical input of the digital video camera; and moving the lens to a second test position away from the optical input of the digital video camera.

8. The method according to claim 1, further comprising identifying an area of special interest within an image of the first subset of images, and wherein comparing an image of the first subset of images with an image of the second subset of images is performed by comparing a subsection comprising the area of special interest of the image of the first subset of images with a subsection of the image of the second subset of images corresponding to the area of interest of the image of the first subset of images.

9. The method according to claim 1, wherein moving the image sensor and/or the lens of the digital video camera from the normal position to the test position further comprises:

moving the image sensor and/or the lens to a first test position towards an optical input of the digital video camera; and moving the image sensor and/or the lens to a second test position away from the optical input of the digital video camera.

10. A digital video camera for improving the image quality of images in a video image stream, comprising:

an image sensor arranged to capture image data;

an image processor arranged to process the image data captured by the image sensor into images, and to output images as the video image stream; and an actuator arranged to move the image sensor or a lens from a respective normal position to a respective test position, the test position being different from the normal position;

wherein the image processor is further arranged to compare, by analyzing the sharpness, image quality of a first image being processed from image data being captured when the image sensor or the lens is located in the respective normal position with a second image being processed from image data being captured when the image sensor or the lens is located in the respective test position; arranged to determine, based on the comparison, if the second image exhibits improved image quality as compared with the first image; and on a condition that the second image exhibits improved image quality as compared with the first image, arranged to initiate a refocus operation on the digital video camera; and wherein the actuator and the image sensor are arranged such that the capturing of the second image is interspersed with the capturing of the first image at a dynamic rate dependent on at least one of bandwidth and system load.

11. The digital camera according to claim 10, wherein the image processor is arranged to determine the sharpness of an image by using a spatial high frequency analysis.

12. The digital camera according to claim 10, wherein the actuator is further arranged to move the image sensor or the lens from the respective test position back to the respective normal position.

13. A method for improving the image quality of images in a video image stream captured by a digital video camera, comprising:

capturing a first subset of images by the digital video camera;

outputting the images of the first subset of images as the video image stream;

moving at least one of an image sensor and a lens of the digital video camera from a respective normal position to a respective test position, the test position being different from the normal position, wherein the test position includes a first test position towards an optical input of the digital video camera and a second test position away from the optical input of the digital video camera;

capturing an image of a second subset of images while the at least one of the image sensor and the lens of the digital video camera is in the test position, capturing the second subset of images using the digital camera, wherein the capturing of the second subset of images is interspersed with the capturing of the first subset of images;

comparing image quality, based on analyzing sharpness, of an image of the first subset of images with an image of the second subset of images; and determining, based on the comparison of image quality, if the image of the second subset of images exhibits improved image quality as compared with the image of the first subset of images;

wherein on a condition that the image of the second subset of images exhibits improved image quality as compared with the image of the first subset of images, initiating a refocus operation on the digital video camera.

14. The method according to claim 13, wherein the capturing of the second subset of images is interspersed with the capturing of the first subset of images at a predetermined rate.

15. The method according to claim 13, wherein the capturing of the second subset of images is interspersed with the capturing of the first subset of images at a dynamic rate depending on at least one of available bandwidth and system load.

16. The method according to claim 13, wherein outputting the images of the first subset of images as the video image stream is made at a predetermined frame rate.

17. The method according to claim 13, wherein the sharpness of an image is determined by using a spatial high frequency analysis.

18. A method for improving the image quality of images in a video image stream captured by a digital video camera, comprising:
    capturing a first subset of images by the digital video camera;
    outputting the images of the first subset of images as the video image stream;
    moving at least one of an image sensor and a lens of the digital video camera from a respective normal position to a respective test position, the test position being different from the normal position;
    capturing an image of a second subset of images while the at least one of the image sensor and the lens of the digital video camera is in the test position,
    capturing the second subset of images using the digital camera, wherein the capturing of the second subset of images is interspersed with the capturing of the first subset of images;
    comparing image quality, based on analyzing sharpness, of an image of the first subset of images with an image of the second subset of images; and
    determining, based on the comparison of image quality, if the image of the second subset of images exhibits improved image quality as compared with the image of the first subset of images,
    wherein on a condition that the image of the second subset of images exhibits improved image quality as compared with the image of the first subset of images, initiating a refocus operation on the digital video camera; and
    identifying an area of special interest within an image of the first subset of images, wherein comparing an image of the first subset of images with an image of the second subset of images is performed by comparing a subsection comprising the area of special interest of the image of the first subset of images with a subsection of the image of the second subset of images corresponding to the area of interest of the image of the first subset of images.

19. The method according to claim 18, wherein moving the at least one of the image sensor and the lens of the digital video camera from the normal position to the test position further comprises:
    moving the at least one of the image sensor and the lens to a first test position towards an optical input of the digital video camera; and
    moving the at least one of the image sensor and the lens to a second test position away from the optical input of the digital video camera.

* * * * *